(12) United States Patent
Harple et al.

(10) Patent No.: US 9,871,956 B2
(45) Date of Patent: Jan. 16, 2018

(54) MULTIPLE LENSES IN A MOBILE DEVICE

(75) Inventors: Todd S. Harple, Hillsboro, OR (US);
Gyan Prakash, Beaverton, OR (US);
Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1 day.

(21) Appl. No.: 13/996,652

(22) PCT Filed: Apr. 26, 2012

(86) PCT No.: PCT/US2012/035279
§ 371 (c)(1),
(2), (4) Date: May 6, 2014

(87) PCT Pub. No.: WO2013/162585
PCT Pub. Date: Oct. 31, 2013

(65) Prior Publication Data
US 2014/0247373 A1 Sep. 4, 2014

(51) Int. Cl.
*H04N 5/225* (2006.01)
*H04N 5/232* (2006.01)

(52) U.S. Cl.
CPC ......... *H04N 5/2254* (2013.01); *H04N 5/2258* (2013.01); *H04N 5/23229* (2013.01); *H04N 5/232* (2013.01); *H04N 5/23238* (2013.01)

(58) Field of Classification Search
CPC ............................ H04N 5/2254; H04N 5/2329
(Continued)

(56) References Cited

U.S. PATENT DOCUMENTS

2005/0220361 A1* 10/2005 Yamasaki .......... G06K 9/00785
382/284
2010/0245545 A1 9/2010 Ilich-Toay
(Continued)

FOREIGN PATENT DOCUMENTS

CN 1681297 A 10/2005
JP 2003-189168 A 7/2003
(Continued)

OTHER PUBLICATIONS

International Search Report and Written Opinion received for PCT Patent Application No. PCT/US2012/035279, dated Dec. 14, 2012, 9 pages.
(Continued)

*Primary Examiner* — Twyler Haskins
*Assistant Examiner* — Fayez Bhuiyan
(74) *Attorney, Agent, or Firm* — Grossman, Tucker, Perreault & Pfleger, PLLC

(57) ABSTRACT

Generally, this disclosure describes multiple lenses in a mobile device. A mobile device may include a housing including a first surface, an opposing second surface and third, fourth, fifth and sixth surfaces connecting the first surface and the second surface forming the housing; a plurality of lenses, each lens configured to capture a respective image, each lens positioned relative to the housing so that a respective lens axis associated with each lens is perpendicular within a tolerance to at least a portion of at least one surface and a first lens axis associated with a first lens is perpendicular within the tolerance to a second lens axis associated with a second lens; at least one image sensor coupled to the plurality of lenses, configured to convert each captured image into respective image data; and circuitry configured to receive and process the image data.

28 Claims, 6 Drawing Sheets

(58) Field of Classification Search
USPC .................................................... 348/222.1
See application file for complete search history.

(56) References Cited

U.S. PATENT DOCUMENTS

| | | | | |
|---|---|---|---|---|
| 2011/0137117 | A1* | 6/2011 | Jacobsen | A61B 1/05 600/109 |
| 2012/0062453 | A1 | 3/2012 | Oks et al. | |
| 2013/0100538 | A1* | 4/2013 | Kim | G02B 13/009 359/683 |
| 2013/0194428 | A1* | 8/2013 | Chao | G01C 21/20 348/159 |

FOREIGN PATENT DOCUMENTS

| | | |
|---|---|---|
| JP | 2010-124326 A | 6/2010 |
| TW | M392773 U1 | 11/2010 |
| TW | M404808 U1 | 6/2011 |
| TW | M422248 U1 | 2/2012 |

OTHER PUBLICATIONS

International Preliminary Report on Patentability and Written Opinion received for PCT Patent Application No. PCT/US2012/035279, dated Nov. 6, 2014, 6 pages.

Taiwanese Office Action and Search Report issued in Taiwanese Application No. 102114190, dated Oct. 11, 2016, with English translation of Search Report.

* cited by examiner

MULTIPLE LENSES IN A MOBILE DEVICE

FIELD

This disclosure relates to multiple lenses, more particularly multiple lenses in a mobile device.

BACKGROUND

Mobile devices such as smartphones and tablet computers typically include one or two cameras. The cameras are typically located so that their fields of view are perpendicular to a display surface of the mobile device. One camera is configured to allow a user to capture an image in the camera's field of view while the image is displayed on the mobile device display. A second camera may generally be positioned to capture the user's image, for example, with the display surface positioned in front of the user's face. These one or two cameras generally limit the allowable orientation of the mobile device for image capture to, for example, a distance about arm's length from the user with the display surface generally parallel to the user's long axis, e.g., vertical for a user that is standing.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes a camera system and method for a mobile device. The camera system generally includes a plurality of lenses, one or more image sensors and a plurality of lens peripherals coupled to a camera processing unit. Each of the lenses is positioned relative to a surface of the mobile device. The lenses are configured to capture images in a plurality of directions. One or more lenses may be active at a given point in time. An active lens may be selected based on orientation of the mobile device, change in orientation of the mobile device, a user input, an input from a remote source and/or policy.

The mobile device includes a first device surface, a generally opposing second device surface and a bezel connecting the first device surface and the second device surface thereby forming a housing. At least a portion of the bezel is generally perpendicular to the first device surface and/or the second device surface. At least one lens ("bezel lens") is positioned relative to the bezel so that an associated lens axis of at least one lens is generally perpendicular to a surface of the bezel and generally parallel to the first device surface and/or the second device surface. As used herein, "generally perpendicular" means perpendicular to within a tolerance and "generally parallel" means parallel to within a tolerance.

Thus, the camera system is configured to facilitate image capture in a plurality of directions without generally limiting the allowable orientation of the mobile device. For example, a mobile device including a camera system consistent with the present disclosure may be utilized for augmented reality. In another example, the mobile device may be utilized for remote surveillance. In this example, captured image data may be provided to a remote service and/or a remote user. The camera system may be configured to respond to commands from the remote service and/or remote user.

Figure 1A:
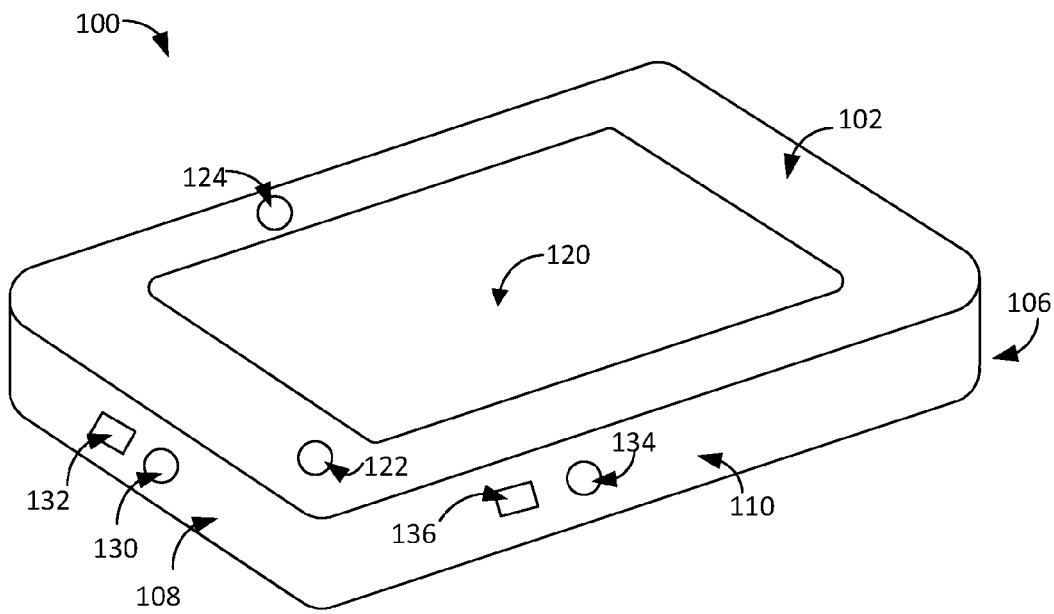
FIGS. 1A and 1B illustrate a mobile device with a plurality of lenses consistent with various embodiments of the present disclosure.
Figure 1B:
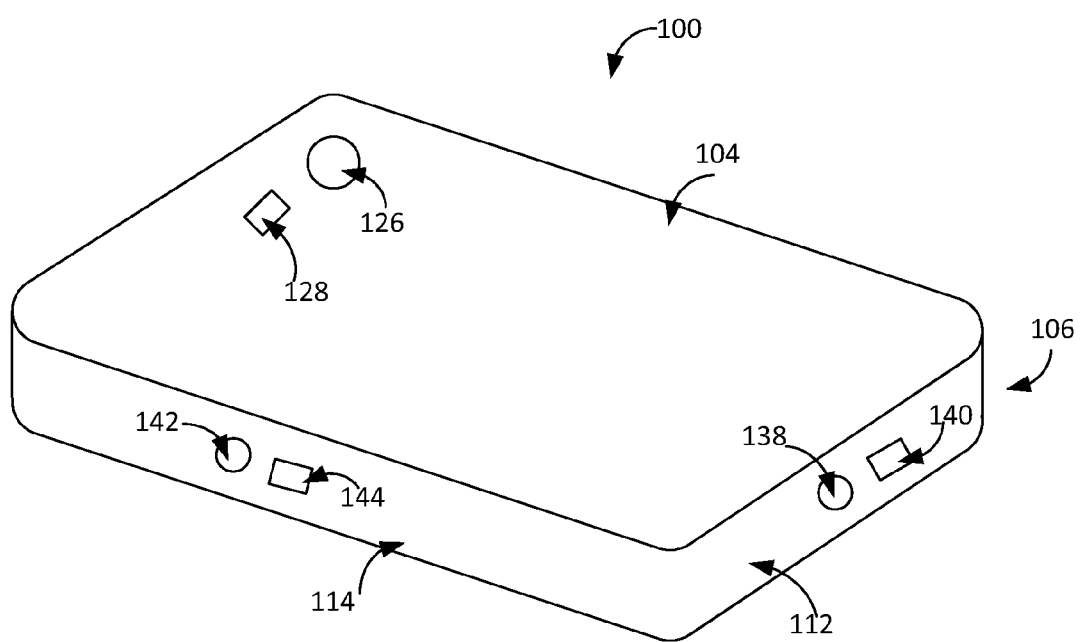

FIGS. 1A and 1B illustrate two views of a mobile device 100 that includes a plurality of lenses consistent with various embodiments of the present disclosure. "Mobile device" as used herein means any handheld computing device, including, but not limited to, mobile telephones, smartphones, tablet computers, notebook computers, ultraportable computers, ultramobile computers, netbook computers, subnotebook computers, personal digital assistants, enterprise digital assistants, mobile internet devices and personal navigation devices. As used herein, "lens" includes simple lenses (a single optical element) as well as compound lenses (array of simple lenses).

The mobile device 100 includes a first surface 102, an opposing second surface 104 and third, fourth, fifth and sixth surfaces 108, 110, 112, 114, respectively, connecting the first surface 102 and the second surface 104 thereby forming a housing of the mobile device 100. For example, the first surface 102 may correspond to a first device surface, the second surface 104 may correspond to a second device surface and surfaces 108, 110, 112, 114 may be included in a bezel 106. The first device surface 102, the second device surface 104 and the bezel 106 may thereby form a housing.

Thus, the mobile device 100 may include a first device surface 102 and an opposing second device surface 104 connected by a bezel 106. The first device surface 102 may be generally parallel to the second device surface 104. At least a portion of the bezel 106 is generally perpendicular to the first device surface 102 and/or the second device surface 104. Generally perpendicular corresponds to perpendicular within a tolerance of plus or minus ten degrees and generally parallel corresponds to parallel within a tolerance of plus or minus ten degrees. The first device surface 102, second device surface 104 and the bezel 106 may thus form a housing of the mobile device 100.

The bezel 106 may include first, second, third and fourth bezel surfaces 108, 110, 112 and 114, respectively. The first bezel surface 108 may generally oppose the third bezel surface 112 and the second bezel surface 110 may generally oppose the fourth bezel surface 114. At least a portion of the first bezel surface 108 may be generally perpendicular to at least a portion of the second bezel surface 110 and at least a portion of the fourth bezel surface 114. Similarly, at least a portion of the third bezel surface 112 may be generally perpendicular to at least a portion of the second bezel surface 110 and at least a portion of the fourth bezel surface 114.

For example, the first device surface 102 may be termed a front surface and the second device surface 104 may be termed a back surface. Continuing with this example, the first bezel surface may then be termed a top surface, the third bezel surface 112 may be termed a bottom surface, the second bezel surface 110 may be termed a left side surface and the fourth bezel surface 114 may be termed a right side surface. The terms in this example correspond to the mobile device 100 positioned generally vertically so that the top surface 108 is above the bottom surface 112 and the front surface 102 is facing a user. It should be noted that when the mobile device 100 is oriented differently, different surfaces may then correspond to front, back, top, bottom, left side and right side.

The first device surface 102 may include a display 120. The display 120 is configured to display one or more captured images and/or received images to a user. The captured and/or received images may include single frame images such as still photographs as well as multi-frame images such as video, including streaming video. The display 120 may be further configured as a user input device, as is known in the art.

Mobile device 100 may include a plurality of lenses 122, 124, 126, 130, 134, 138, 142. Each lens may be positioned relative to the housing so that the lens's associated lens axis is substantially perpendicular to an associated surface. As used herein, "lens axis" corresponds to a centerline of an angle of coverage of a lens. The lens angle of coverage corresponds to the angle range that the lens can image. A lens-image sensor combination may then have an associated field of view (angle of view) that corresponds to the angular extent of a given scene that is imaged by a lens-image sensor combination. The angle of coverage is typically greater than the angle of view. As used herein, "lens angle of view" corresponds to the angle of view of a lens-image sensor combination.

The plurality of lenses may include one or more standard lenses 122, 124 and 126. For example, one or more standard lenses 122, 124, 126 may be positioned relative to the first device surface 102 and/or the second device surface 104. A lens axis of the at least one standard lens is generally perpendicular (perpendicular to within a tolerance) to the first device surface 102 and/or the second device surface 104 of the mobile device 100 and may be parallel a surface of the bezel 106.

For example, a first standard lens 122 may be associated with the first device surface 102 and positioned relatively closer to the first bezel surface 108 and the second bezel surface 110 than to the third bezel surface 112 and the fourth bezel surface 114. Additionally or alternatively, a second standard lens 124 may be associated with the first device surface 102 and positioned relatively closer to the fourth bezel surface 114 than to the second bezel surface 110. Additionally or alternatively, a third standard lens 126 may be associated with the second device surface 104. The third standard lens 126 may be positioned relatively closer to the first bezel surface 108 and the second bezel surface 110 than to the third bezel surface 112 and the fourth bezel surface 114.

The plurality of lenses includes at least one bezel lens 130, 134, 138, 142. A first bezel lens 130 may be associated with the first bezel surface 108. Additionally or alternatively, a second bezel lens 134 may be associated with the second bezel surface 110. Additionally or alternatively, a third bezel lens 138 may be associated with the third bezel surface 112. Additionally or alternatively, a fourth bezel lens 138 may be associated with the fourth bezel surface 114. A lens axis of the first bezel lens 130 may be generally perpendicular to the first bezel surface 108. Similarly, a respective lens axis of the second, third, and fourth bezel lenses 134, 138, 142 may be generally perpendicular to the respective second, third, and fourth bezel surfaces 110, 112, 114.

It is contemplated that one or more lenses 122, 124, 126, 130, 134, 138, 142 may be movably mounted relative to their associated (device or bezel) surfaces. The movable mounting is configured to allow movement of a lens such that its associated lens axis may be at an angle other than generally perpendicular to the lens's associated surface (device or bezel). For example, the movable mounting may be configured for manual (e.g., by a user) adjustment. In another example, the lens axis position may be automatically adjusted in response to a change in orientation of the mobile device 100 (e.g., gyroscopically).

Mobile device may include a plurality of lens peripherals 128, 132, 136, 140, 144. Each lens peripheral 128, 132, 136, 140, 144 may be associated with at least one lens. Each lens peripheral 128, 132, 136, 140, 144 may be positioned relatively near at least one of its associated lenses. Each lens peripheral 128, 132, 136, 140, 144 may include autofocus circuitry, shutter circuitry, a lens active indicator (e.g., light emitting diode (LED)), flash circuitry and/or pre-flash circuitry.

For example, a standard lens peripheral 128 may be associated with the third standard lens 126 and may be positioned relative to the second device surface 128 relatively near the third standard lens 126. A first bezel lens peripheral 132 may be associated with the first bezel lens 130 and may be positioned relative to the first bezel surface 108 relatively near the first bezel lens 130. Similarly, a second bezel lens peripheral 136 may be associated with the second bezel lens 134 and may be positioned relative to the second bezel surface 110 relatively near the second bezel lens 134, and similarly for the third bezel lens 138, the third bezel lens peripheral 140 and third bezel surface 112 and for the fourth bezel lens 142, the fourth bezel lens peripheral 144 and fourth bezel surface 114.

Thus, a mobile device that includes a plurality of lenses, including at least one bezel lens 130, 134, 138, 142, is configured to have a combined field of view relatively greater than a mobile device with only standard lenses 122, 124, 126. The plurality of lenses is further configured to provide greater flexibility in mobile device orientation for a desired scene capture.

For example, for a mobile device (e.g., mobile device 100) that is oriented so the first surface 102 that includes the display 120 is substantially horizontal, at least one bezel lens 130, 134, 138, 142 may be active. For example, in augmented reality, a captured image may be overlaid with information and/or images from another source. Continuing with this example, a user may orient the mobile device 100 so that the first surface 102 is substantially horizontal and at least one bezel lens 130, 134, 138, 142 may be active. The active bezel lens may capture an image of a building with a sign with words in a language unfamiliar to the user. Augmented reality may include displaying a translation of the words in a language selected by the user overlaid on the image of the building. In this example, the user may hold the mobile device 100 close to the user's body and be able to see the display 120 with the captured image and the augmented reality overlay. Thus, a mobile device 100 that includes a camera system consistent with the present disclosure may allow a user to capture an image of a scene in front of the user and to simultaneously view the captured image while holding the mobile device conveniently close to the user's body, oriented generally horizontally.

Figure 2A:
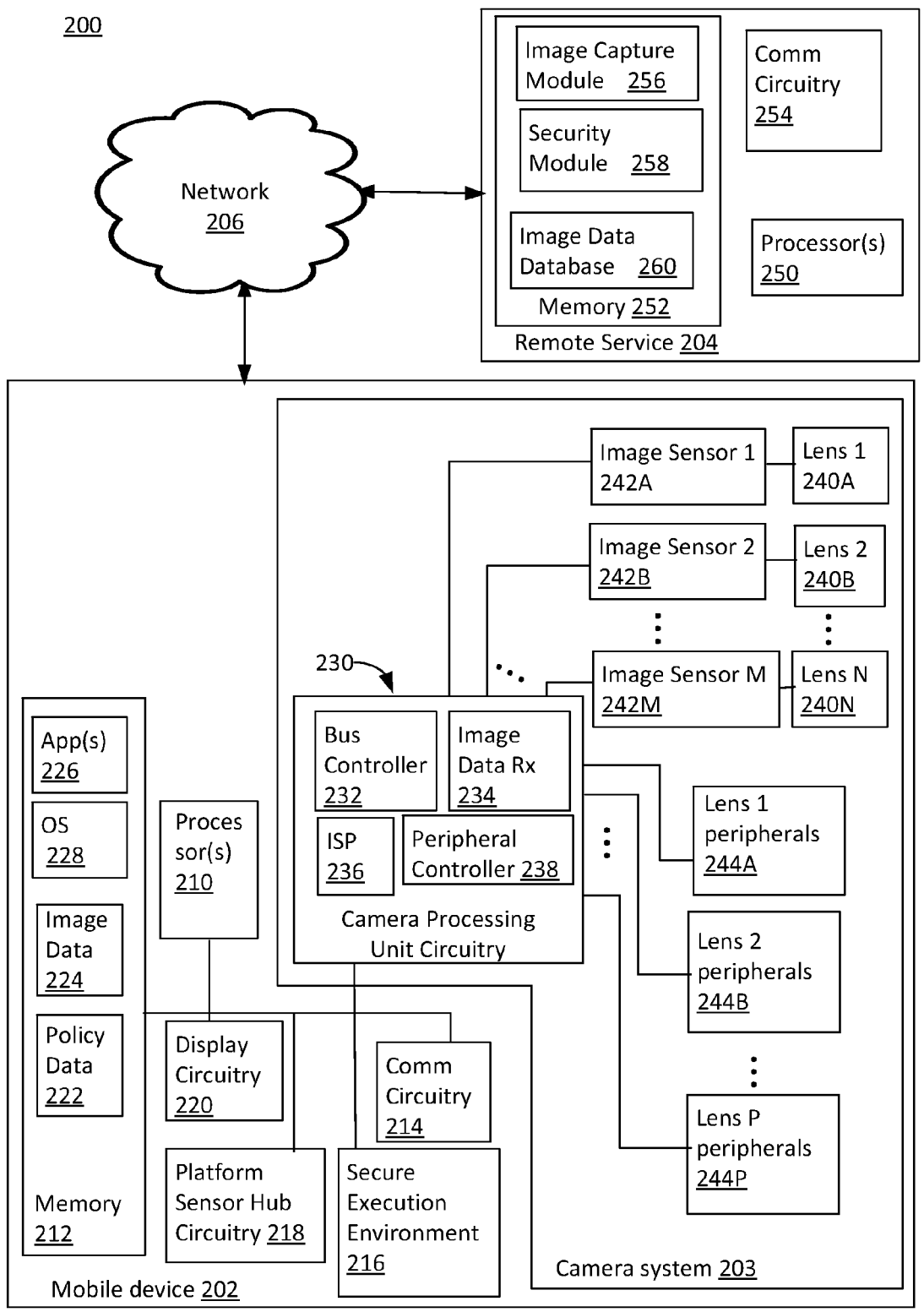
FIG. 2A illustrates a multi-lens system consistent with various embodiments of the present disclosure.

FIG. 2A illustrates a multi-camera system 200 consistent with various embodiments of the present disclosure. The system 200 generally includes a mobile device 202, a remote service 204 and a network 206. For example, mobile device 202 may correspond to mobile device 100 of FIGS. 1A and 1B.

Mobile device 202 may include a camera system 203, processor(s) 210 configured to perform the operations of one or more application(s) 226 and a memory 212 configured to store policy data 222, image data 224, the one or more application(s) 226 and an operating system OS 228. Mobile device 202 may include communication circuitry 214 configured to communicate with network 206 and/or remote service 204 using a variety of communication protocols as described herein. Mobile device 202 may be configured to communicate with network 206 using one or more communication protocols, including, but not limited to, NFC, RFID, Wi-Fi, Bluetooth, 3G, 4G and/or some other communication protocol.

Mobile device 202 may include a secure execution environment 216, a platform sensor hub circuitry 218 and display circuitry 220. The secure execution environment 216 is configured to provide a secure, limited access environment for processing and storage. For example, the secure execution environment 216 may include cryptographic circuitry configured to store and manage cryptographic key(s) and to perform decryption functions.

The platform sensor hub circuitry 218 is configured to detect orientation and change in orientation (i.e., movement) of mobile device 202. The platform sensor hub circuitry 218 may be configured to detect rate of change of orientation of mobile device 202. For example, the platform sensor hub circuitry may include, but is not limited to, accelerometer(s), a compass, gyroscope(s), inertial sensor(s), GPS (Global Positioning System) circuitry and/or ambient light sensor circuitry. Whether a standard and/or bezel lens is active may be based, at least in part, on mobile device orientation and/or change in orientation, as described herein.

Display circuitry 220 corresponds to display 120 of FIGS. 1A and 1B. Display circuitry 220 may be configured to display image data 224, corresponding to image(s) captured by any one or more of the plurality of standard lenses 122, 124, 126 and/or bezel lenses 130, 134, 138, 142, and/or remote image data received, for example, from remote service 204. Display circuitry 220 is configured to display one or more images simultaneously. For example, display circuitry 220 may be configured as a split screen so that the display is divided into a plurality of regions with each region displaying one image. In some embodiments, the regions may overlap. In other embodiments, the regions may be contiguous but may not overlap. In yet other embodiments, the display 220 may be configured to display image(s) corresponding to captured image(s) overlaid with additional information associated with augmented reality, as may be understood by those skilled in the art.

Camera system 203 may include a camera processing unit 230, a plurality of lenses 240A, . . . , 240N, one or more image sensor(s) 242A, . . . , 242M and a plurality of lens peripherals 244A, . . . , 244P. The plurality of lenses 240A, . . . , 240N includes at least one bezel lens 130, 134, 138, 142 and may include a standard lens 122, 124, 126. Each lens 240A, . . . , 240N may be coupled to an image sensor 242A, . . . , 242M.

In an embodiment, each lens 240A, . . . , 240N may be coupled to a respective image sensor 242A, . . . , 242M. In this embodiment, a number N of lenses may equal a number M of image sensors. In another embodiment, a subset of the plurality of lenses may share an image sensor. In this embodiment, the number M of image sensors may be less than the number N of lenses.

Figure 2B:
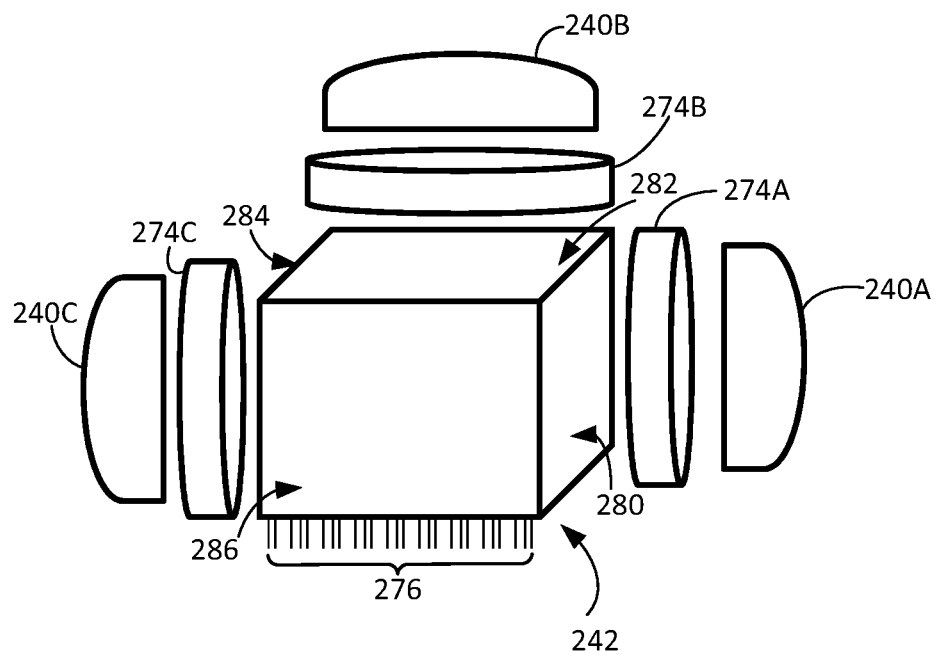
FIG. 2B illustrates a plurality of lenses coupled to one sensor consistent with an embodiment of the present disclosure.

FIG. 2B illustrates one example of a plurality of lenses coupled to one image sensor consistent with an embodiment of the present disclosure. Image sensor 242 corresponds to any one of image sensors 242A, . . . , 242M of FIG. 2A. Image sensor 242 may include a plurality of electrical contacts 276 configured to electrically couple the image sensor 242 to for example, camera processing unit circuitry 230, as described herein. The electrical contacts may include, but are not limited to, pins, pads, balls, and/or other electrical contacts configured to couple the image sensor 242 to the camera processing unit circuitry 230. Image sensor 242 may include a plurality of sensor surfaces 280, 282, 284, 286. Sensor surface 280 is generally perpendicular to sensor surface 282 and sensor surface 286 and generally parallel to sensor surface 284. Sensor surface 284 is generally perpendicular to sensor surface 282 and sensor surface 286. For example, image sensor 242 may be generally rectangular and the sensor surfaces 280, 282, 284, 286 may be generally flat.

The image sensor 242 may be optically coupled to a plurality of lenses by one or more optical interfaces, e.g., optical interfaces 274A, 274B, 274C. Each optical interface 274A, 274B, 274C is configured to receive light focused by a respective lens 240A, 240B, 240C, and to carry the received light to a respective image sensor surface. For example, the optical interface may include glass padding. In this example, the glass padding may be a transparent glass material configured to carry light. In another example, the optical interface may include an optical fiber. In another example, the optical interface may include another lens or lenses. The optical interface is configured to guide light from a respective lens to the sensor 242 and to ensure and/or preserve that the guided light is focused on and generally perpendicular to the respective sensor surface.

In the example illustrated in FIG. 2B, image sensor 242 is coupled to three lenses 240A, 240B, 240C by respective optical interfaces 274A, 274B, 274C. Lens 240A is coupled to sensor surface 280, lens 240B is coupled to sensor surface 282 and lens 240C is coupled to sensor surface 284. Thus a lens axis associated with lens 240A is generally parallel to a lens axis associated with lens 240C and generally perpendicular to a lens axis associated with lens 240B.

In another example, lens 240C and optical interface 274C may be coupled to sensor surface 286 rather than sensor surface 284. Lens 240A may be coupled to sensor surface 280 and lens 240B may be coupled to sensor surface 282 as in the prior example. In this example, each lens axis associated with a respective lens 240A, 240B, 240C may be mutually perpendicular. It should be noted that other configurations are possible consistent with the present disclosure.

In another example, unselected lenses may be optically "decoupled" from a shared image sensor by completely closing their associated shutters. In this example, captured image optical data may be provided to the shared image sensor by, for example, an optical fiber. In other words, the optical interface in this example corresponds to an optical fiber.

In some embodiments, at least one image sensor, e.g., image sensor 242A, may be configured to provide relatively higher resolution images than each other image sensor, e.g., image sensors 242B, . . . , 242M. Image sensors capable of producing relatively higher resolution images are generally more expensive than image sensors configured to provide relatively lower resolution images. Thus, at least a portion of the image sensors may be configured to provide relatively lower resolution images.

Each lens 240A, . . . , 240N is configured to capture an image included in an associated angle of view. The captured image may then be provided to an image sensor 242A, . . . , 242M configured to convert light corresponding to the captured image into an electrical representation of the captured image ("image data"). In other words, image sensor output corresponds to image data. The image data may then be transported to a camera processing unit 230 for further processing, display and/or storage. Image data based on a plurality of images captured by a plurality of lenses may be transported to the camera processing unit 230. The camera processing unit 230 is configured to selectively process one or more images based, at least in part, on whether a lens is active (i.e., activated) and/or selected to be active.

Each lens 240A, . . . , 240N may be selected to be active (i.e., activated) based on at least one of a physical orientation of the mobile device 202, a change in orientation, a local user input, a policy and/or an input received from a remote source, e.g., remote service 204. A plurality of lenses 240A, . . . , 240N may be selected as active. As used herein, "active" and "activated" mean lens output is selected for processing by a camera processing unit (e.g., camera processing unit 230) within a time period. A display image corresponding to the active lens output may then be displayed on the mobile device 202 and/or transported to a remote destination via for example a network 206. Thus, the display 220 may be configured as a "split screen" displaying a plurality of display images to a user so that the user perceives the plurality of images as being displayed simultaneously. The camera processing unit 230 may be configured to multiplex inputs from a plurality of image sensors 242A, . . . , 242M in order to display the plurality of captured images to the user substantially simultaneously.

Each lens peripheral 244A, . . . , 244P may be associated with one or more lenses 240A, . . . , 240N. For example, a subset of the plurality of lenses that are associated with one surface (e.g., device lenses or bezel lenses) of the mobile device, may be associated with one lens peripheral also associated with the one surface. In this example, a number P of lens peripherals may be less than the number N of lenses. In another example, the number P of lens peripherals may be equal to the number N of lenses.

Camera processing unit 230 is configured to receive image data (i.e., electrical representations of captured images) from image sensors 242A, . . . , 242M and to process the received image data for storage, transmission and/or display. The camera processing unit 230 may include a bus controller 232, an image data receiver 234, an image signal processor ISP 236 and a peripheral controller 238. For example, ISP 236 may include a graphics processor as may be known to those skilled in the art.

Bus controller 232 is configured to manage an interface between the image data receiver 234 and the plurality of image sensors 242A, . . . , 242M. For example, the bus controller 232 and/or the image data receiver 234 may comply or be compatible with the CSI-2 protocol for data transmission between a peripheral device (camera, i.e., lens-image sensor pair) and a host processor (e.g., camera processing unit 230). For example, the bus may correspond to an $I^2C$ bus protocol. In another example, the bus may correspond to an SMBus protocol. In another example, the bus controller 232 and/or the image data receiver 234 may comply or be compatible with the ITU-R BT.656 protocol.

Bus controller 232 is configured to manage coupling the image data receiver 234 to one or more active image sensors of the plurality of image sensors 242A, . . . , 242M. Active image sensor corresponds to the image sensor associated with an active lens. For example, bus controller 232 may be configured to multiplex image data output from a plurality of active image sensors 242A, . . . , 242M by sequentially coupling each of the plurality of active image sensors to the image data receiver 234 for a time interval (i.e., time division multiplexing). For example, the time interval may correspond to a frame (i.e., one complete image) of image data from each selected sensor. In another example, the time interval may correspond to a portion of a frame of image data from each selected image sensor. In another example, the time interval may correspond to a plurality of frames of image data. Thus, a plurality of captured images may be displayed to a user so that the plurality of images are displayed in what appears to be simultaneously to the user.

The image data receiver 234 is configured to receive the image data from the selected sensor and to provide the received image data to the image processor ISP 236. The image data receiver 234 may include a plurality of inputs configured to receive image data from a plurality of image sensors generally in parallel. The image data receiver 234 may receive serial image data from an image sensor. The image data receiver 234 may be configured to convert received serial image data to parallel data for processing by ISP 236.

The ISP 236 may be configured to process the converted image data based on a command from processor(s) 210. The ISP 236 may be configured to perform image enhancement, color correction, color space conversion and/or image size conversion. In an embodiment consistent with the present disclosure, the ISP 236 may be configured to perform pattern recognition. In another embodiment consistent with the present disclosure, ISP 236 may be configured to detect movement in a scene captured by a plurality of sequential frames by, for example, detecting differences between the image data associated with the frames. Such pattern recognition and movement detection functions may be utilized, for example, for surveillance.

Peripheral controller 238 is configured to manage the lens peripherals 244A, . . . , 244P based, at least in part, on the selected active lens(es). Thus, peripheral controller 238 may be configured to control one or more of the autofocus, shutter, selected lens indicator, flash and preflash functions for an associated active lens.

Mobile device 202 and/or camera system 203 are configured to communicate with remote service 204 via network 206. Remote service 204 is configured to control mobile device 202 remotely. Remote service 204 may be configured to provide remote control of the image capture functions of camera system 203, based at least in part, on image data from camera system 203 received by remote service 204. The remote service 204 may correspond to one or more servers in a plurality of servers, i.e., may be in the cloud. Remote service 204 includes one or more processor(s) 250, memory 252 and communication circuitry 254. The memory 252 may include an image capture module 256, a security module 258 and/or image data database 260. Processor(s) 250 are configured to perform operations associated with one or more applications. The communication circuitry 254 is configured to couple the remote service 204 to mobile device 202 and/or network 206.

For example, a mobile device 202, including camera system 203, may be used as a surveillance device. The mobile device 202 may be positioned so that the fields of view of a plurality of lenses 240A, . . . , 240N include scenes where surveillance is desired. In this example, a plurality of lenses 240A, . . . , 240N may be activated sequentially, for example at a time interval. The camera system 203 may be configured to analyze each captured image to detect movement in the captured image. The camera system 203 may be further configured to detect predefined patterns (i.e., pattern recognition) in the captured images. If movement is detected and/or a pattern is recognized, the associated lens may then be activated (and/or maintained active) and other lenses may not be activated (and/or deactivated). An alert may then be provided to a remote user and/or a remote service 204. The remote service 204 may be configured to transmit a response to mobile device 202 via network 206. The response may be configured to command the camera system 203 to activate selected lenses, and transmit and/or store captured image data. The mobile device 202 and camera system 203 may then be configured to adjust the active lens and/or record captured images based on the response. In this manner, a mobile device 202 including a camera system 203 consistent with the present disclosure may be utilized for surveillance/security. Remote control of the mobile device 202 and camera system 203 may be configured to enhance the surveillance function.

Thus, a mobile device including a camera system consistent with the present disclosure may include a plurality of lenses configured to capture images in a plurality of directions. One or more lenses may be active at a given point in time. The active lens(es) may be selected based on an orientation of the mobile device, a user input, an input from a remote source and/or policy. The mobile device, including the camera system, may be utilized, for example, for augmented reality applications and/or surveillance, as described herein.

Figure 3:
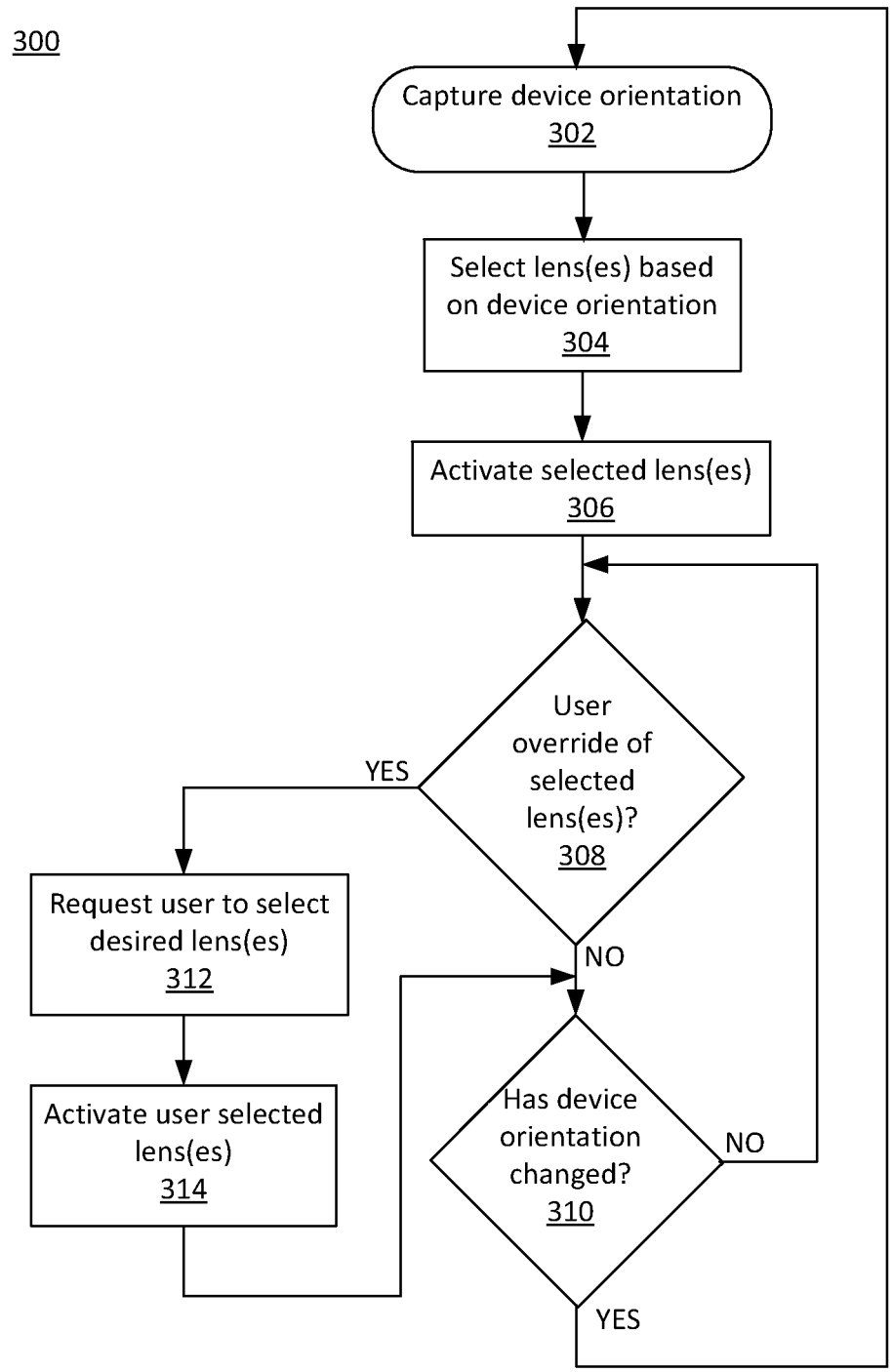
FIG. 3 illustrates a flowchart of exemplary operations for active lens selection based on device orientation consistent with an embodiment of the present disclosure.

FIG. 3 illustrates a flowchart 300 of exemplary operations consistent with an embodiment of the present disclosure. The operations may be performed, for example, by the mobile device 202 and/or the camera system 203. In particular, flowchart 300 depicts exemplary operations configured to select lens(es) for activation based on the orientation of the mobile device 202. The operations of flowchart 300 may be initiated in response to a change in device orientation and/or an input configured to select active lens(es).

Operation 302 includes capturing device orientation. For example, camera system 203 may be configured to capture device orientation data from platform sensor hub circuitry 218. Operation 304 includes selecting lens(es) based on device orientation. For example, if the device orientation is such that the first device surface 102 is generally horizontal and positioned above the second device surface 104, the first bezel lens 130 may be selected. The selected lens(es) may be activated at operation 306. For example, bus controller 232 may be configured to couple an image sensor associated with the active lens to image data receiver 234 in order to activate the selected lens.

Whether a user override of the selected lens has been detected may be determined at operation 308. For example, when a lens selected for activation changes in response to a change in device orientation, a user may choose to activate other lens(es). The user may select a displayed option to override the selected lens. If a user override is not detected, whether the device orientation has changed may be determined at operation 310. If the device orientation has not changed, program flow may proceed to operation 308 to determine whether a user override has been detected. If the device orientation has changed, program flow may proceed to operation 302 to capture the device orientation.

If a user override is detected at operation 308, then the user may be asked to select desired lens(es) for activation at operation 312. The user-selected lens(es) may then be activated at operation 314. Program flow may then proceed to operation 310.

Thus, one or more lens(es) may be activated based on device orientation. If the device orientation changes, the lens(es) selected for activation may change correspondingly. The user may be provided the option of overriding the lens selection.

Figure 4:
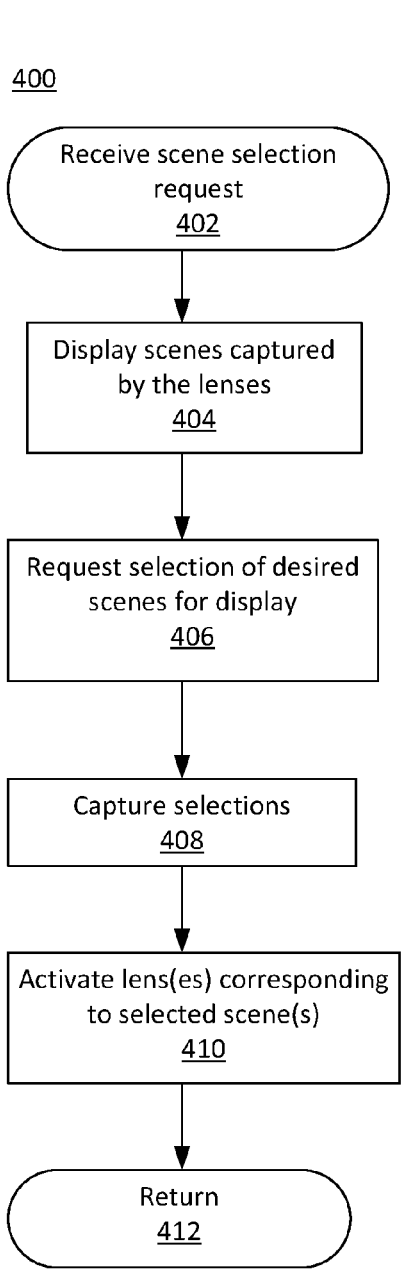
FIG. 4 illustrates a flowchart of exemplary operations for lens activation based on user scene selection consistent with an embodiment of the present disclosure.

FIG. 4 illustrates a flowchart 400 of exemplary operations consistent with an embodiment of the present disclosure. The operations may be performed, for example, by the mobile device 202 and/or the camera system 203. In particular, flowchart 400 depicts exemplary operations configured to allow a user to select scene(s) based on a plurality of scenes displayed to the user simultaneously as a "split-screen" on, for example, display 220 of mobile device 202. As a result of the user's selection, lens(es) corresponding to the user's selected scene(s) may be maintained active and lens(es) corresponding to unselected scene(s) may be deactivated.

The operations of flowchart 400 may be initiated 402 in response to a scene selection request. For example, the scene selection request may be provided locally by a user touching a scene selection button displayed on display 120, 220. In another example, the scene selection request may be received from a remote source, e.g., remote service 204.

Operation 404 may include displaying images captured by a plurality of lenses. For example, in response to a local user request the captured images may be displayed simultaneously in a split-screen format on the mobile device display. In this example, the camera system may be configured to multiplex image data associated with the captured images so that the split-screen format appears to the user as the plurality of images being captured simultaneously. In another example, in response to a remote request, the image data corresponding to the captured images may be transported to the remote service for display and/or analysis, as described herein.

Operation 406 may include requesting selection of desired scenes for display. For example, a local user may select scenes desired for display by touching the mobile device display where the desired scene(s) are displayed. In another example, remote service may be configured to select desired scenes using a scene identifier, for example the scene ID may correspond to an associated lens identifier. Scene selections may be captured at operation 408. Operation 410 may include activating the lens(es) corresponding to the selected scenes. Program flow may then return at operation 412.

Thus, a mobile device that includes a camera system consistent with the present disclosure may be configured to provide a user and/or a remote service image data corresponding to captured images (scenes) from a plurality of lenses and allow the user and/or remote service to select which lens(es) to maintain active based on the captured images.

Figure 5:
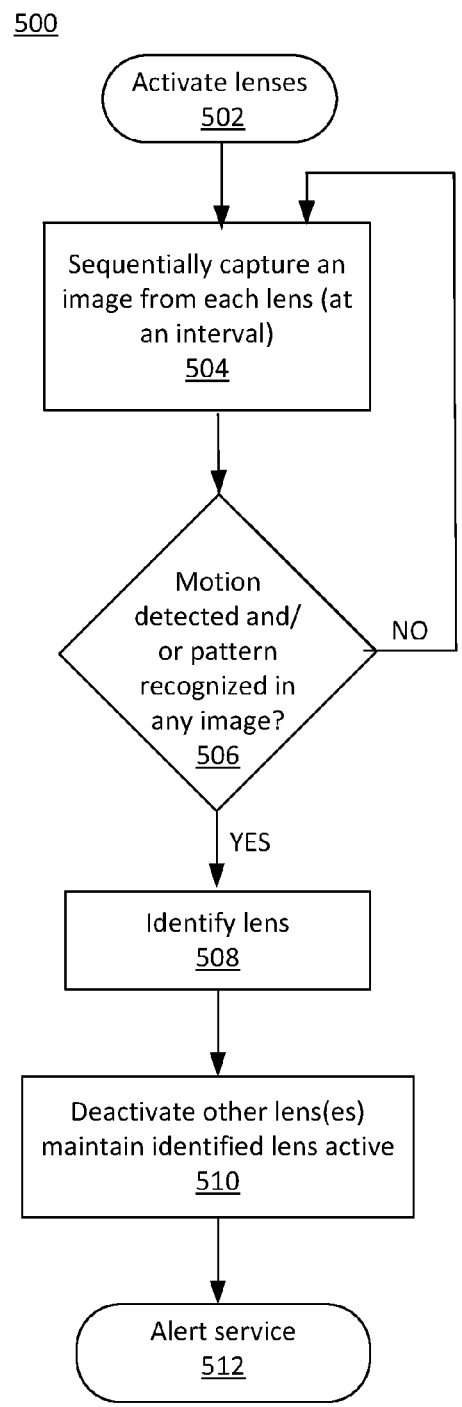
FIG. 5 illustrates a flowchart of exemplary operations for surveillance consistent with one embodiment of the present disclosure.

FIG. 5 illustrates a flowchart 500 of exemplary operations consistent with an embodiment of the present disclosure. The operations may be performed, for example, by the mobile device 202 and/or the camera system 203. In particular, flowchart 500 depicts exemplary operations configured for remote surveillance utilizing the mobile device 202 and the camera system 203. The operations of flowchart 500 may be initiated in response to a local user input and/or a command received from a remote source, e.g., remote service 204.

At least a portion of the lenses may be activated at operation 502. For example, any lens with a field of view that includes at least a portion of a desired surveillance region may be activated. As many as all of the lenses included in the camera system may be activated. Operation 504 may include sequentially capturing an image from each lens at an interval. For example, each lens's associated image sensor may be coupled to the camera processing unit for a time period at an interval allowing scenes captured by all of the active lenses to be sampled for display and/or analysis.

Whether motion is detected and/or a pattern is recognized in any captured image may be determined at operation 506. If a pattern is recognized, it may be further determined whether the pattern corresponds to "friendly" and not cause for concern or whether the pattern corresponds to unknown and/or "hostile" (potentially cause for concern). In this manner, benign patterns may be differentiated from patterns that may correspond to a threat. If no motion is detected and/or no pattern is recognized, program flow may proceed to operation 504, sequentially capturing images.

If motion is detected and/or a pattern is recognized, an associated lens may be identified at operation 508. Other lenses may then be deactivated and the identified lens may be maintained active at operation 510. A remote service may then be alerted at operation 512.

Figure 6:
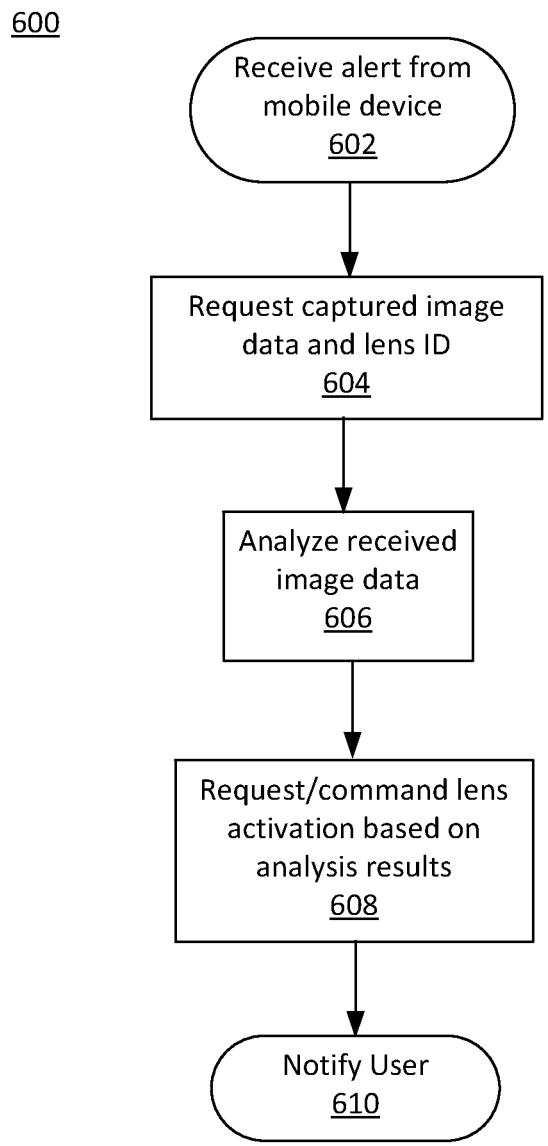
FIG. 6 illustrates a flowchart of exemplary operations for remote surveillance consistent with an embodiment of the present disclosure.

FIG. 6 illustrates a flowchart 600 of exemplary operations consistent with an embodiment of the present disclosure. The operations may be performed, for example, by remote service 204. In particular, flowchart 600 depicts exemplary operations configured to provide remote control of a camera system, e.g., camera system 203, for surveillance. The operations of flowchart 600 may begin with receiving 602 an alert from a mobile device. For example, motion and/or a potentially hostile pattern may have been recognized by camera system 203.

Captured image data and a lens identifier may be requested at operation 604. The captured image data may include scenes that suggest motion and/or scenes that include the potentially hostile pattern. The lens ID is configured to correspond to the lens(es) that captured the scene. Operation 606 may include analyzing the received image data. For example, the analysis may be configured to confirm that the motion and/or potential hostile pattern that triggered the alert is motion and/or includes a hostile pattern.

Operation 608 may include requesting and/or commanding a lens activation based on the analysis result. For example, remote service 204 may be configured to transmit request(s) and/or command(s) to mobile device 202 and camera system 203. Remote service 204 may request activation of one or more lens(es) whose associated angle(s) of view are configured to further capture the motion and/or potentially hostile pattern. Images captured by such active lens(es) may then provide more image data for analysis. A user may be notified at operation 610. For example, if the mobile device is positioned at the user's dwelling, such notice may be configured as an alert. Thus, a mobile device that includes a camera system consistent with the present disclosure that is configured for surveillance may be configured to transmit questionable images to the remote service and to receive requests and/or commands from the remote service.

Thus, a mobile device that includes a camera system consistent with the present disclosure may be used for surveillance. Images captured by a plurality of lenses may be analyzed to detect motion and/or patterns that may correspond, for example, to an intruder. The plurality of lenses is configured to provide a combined field of view that is greater than the individual field of view associated with one lens. If, for example, such an intruder is detected, the lens associated with that image may be maintained active and other lenses deactivated, thus providing nearly continuous image capture. The remote service may be configured to receive and store the captured images of the intruder and may be ultimately configured to alert appropriate authorities.

While FIGS. 3 through 6 illustrate various operations according one embodiment, it is to be understood that not all of the operations depicted in FIGS. 3 through 6 are necessary for other embodiments. Indeed, it is fully contemplated herein that in other embodiments of the present disclosure, the operations depicted in FIGS. 3 through 6 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device. The storage medium may be non-transitory.

Mobile device 202 and/or camera system 203 may be configured to communicate with network 206 and/or remote service 204 using a variety of communication protocols. The communications protocols may include but are not limited to wireless communications protocols, such as NFC, RFID, Wi-Fi, Bluetooth, 3G, 4G and/or other communication protocols. The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The NFC and/or RFID communication signal and/or protocol may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006, titled: ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or later versions of these standards.

The Bluetooth protocol may comply or be compatible with the 802.15.1 standard published by the IEEE, titled "IEEE 802.15.1-2005 standard, IEEE Standard for Information technology—Telecommunications and information exchange between systems—Local and metropolitan area networks—Specific requirements Part 15.1: Wireless Medium Access Control (MAC) and Physical Layer (PHY) Specifications for Wireless Personal Area Networks (W Pans)", published in 2005, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

$I^2C$ bus may comply or be compatible with $I^2C$-Bus Specification, version 2.1, January 2000, published by Philips (NXP) Semiconductor and/or version 3.0, Rev. 03, Jun. 19, 2007, published by NXP Semiconductor and/or later versions of these specifications. SMBus may comply or be compatible with SMBus System Management Bus, version 2.0, August 2000, available from System Management Bus Interface Forum, Inc. and/or later versions of this specification.

CSI-2 may comply or be compatible with the MIPI Alliance Standard for Camera Serial Interface CSI-2, version 1.0, released in 2005, by the MIPI (Mobile Industry Processor Interface) Alliance and a second phase, MIPI Alliance Standard for D-PHY [2] that addressed an updated D-PHY specification and JEDEC interleaving, and/or later versions of these specifications.

ITU-R BT.656 may comply or be compatible with the International Telecommunication Union (ITU) Recommendation BT.656-5, titled: Interfaces for digital component video signals in 525-line and 625-line television systems operating at the 4:2:2 level of Recommendation ITU-R BT.601, released in 2007, by the ITU, and or later versions of this standard.

For example, network 206 may comprise a packet switched network. Mobile device 202 and/or camera system 203 may be configured to communicate with network 206 and/or remote service 204 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, mobile device 202 and/or camera system 203 may be configured to communicate with network 206 and/or remote service 204, using an X.25 communications protocol. The X.25 communications protocol may comply or be compatible with a standard promulgated by the International Telecommunication Union-Telecommunication Standardization Sector (ITU-T). Alternatively or additionally, mobile device 202 and/or camera system 203 may be configured to communicate with network 206 and/or remote service 204, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, mobile device 202 and/or camera system 203 may be configured to communicate with network 206 and/or remote service 204, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

"Circuitry", as used in any embodiment herein, may comprise, for example, singly or in any combination, hardwired circuitry, programmable circuitry, state machine circuitry, and/or firmware that stores instructions executed by programmable circuitry. An application ("app") and/or a module, as used in any embodiment herein, may be embodied as circuitry. The circuitry may be embodied as an integrated circuit, such as an integrated circuit chip.

Thus, the present disclosure provides a camera system and method for a mobile device. The camera system generally includes a plurality of lenses, one or more image sensors and a plurality of lens peripherals coupled to a camera processing unit. Each of the lenses is positioned relative to a surface of the mobile device. The lenses are configured to capture images in a plurality of directions. One or more lenses may be active at a given point in time. An active lens may be selected based on orientation of the mobile device, change in orientation of the mobile device, a user input, an input from a remote source and/or policy.

According to one aspect there is provided a mobile device. The mobile device may include a housing including a first surface, an opposing second surface and third, fourth, fifth and sixth surfaces connecting the first surface and the second surface thereby forming the housing; a plurality of lenses, each lens configured to capture a respective image, each lens positioned relative to the housing so that a respective lens axis associated with each lens is perpendicular within a tolerance to at least a portion of at least one surface and a first lens axis associated with a first lens is perpendicular within the tolerance to a second lens axis associated with a second lens; at least one image sensor coupled to the plurality of lenses, configured to convert each captured image into respective image data; and circuitry configured to receive the image data, the circuitry configured to process the image data.

Another example mobile device includes the forgoing components and the circuitry is further configured to activate at least one lens based, at least in part, on an orientation of the housing, activation corresponding to coupling the circuitry to the activated lens to receive the image data.

Another example mobile device includes the forgoing components and also includes a third lens axis associated with a third lens that is perpendicular within the tolerance to the first lens axis and the second lens axis.

Another example mobile device includes the forgoing components and the circuitry is further configured to selectively couple to each lens.

Another example mobile device includes the forgoing components and the circuitry is further configured to maintain a selected lens activated based on image data associated with the selected lens.

Another example mobile device includes the forgoing components and the circuitry is configured to generate a plurality of display images based on respective captured images and to provide the plurality of display images to a display for simultaneous display of the display images.

Another example mobile device includes the forgoing components and a number of image sensors is less than a number of lenses.

According to another aspect there is provided a system. The system may include a mobile device and a remote service. The mobile device may include a housing including a first surface, an opposing second surface and third, fourth, fifth and sixth surfaces connecting the first surface and the second surface thereby forming the housing, a plurality of lenses, each lens configured to capture a respective image, each lens positioned relative to the housing so that a respective lens axis associated with each lens is perpendicular within a tolerance to at least a portion of at least one surface and a first lens axis associated with a first lens is perpendicular within the tolerance to a second lens axis associated with a second lens, at least one image sensor coupled to the plurality of lenses, configured to convert each captured image into respective image data, and circuitry configured to receive the image data, the circuitry configured to process the image data. The remote service is configured to control the mobile device remotely, the remote service including a processor, communication circuitry coupled to the processor, and a memory.

Another example system includes the forgoing components and the remote service is configured to receive image data from the mobile device and to generate a response based on the received image data.

Another example system includes the forgoing components and the remote service is further configured to provide the response to the mobile device, the response configured to cause the mobile device to activate a selected lens and to deactivate other lenses based on the response.

Another example system includes the forgoing components and the circuitry is further configured to activate at least one lens based, at least in part, on an orientation of the housing, activation corresponds to coupling the circuitry to the activated lens to receive the image data.

Another example system includes the forgoing components and also includes a third lens axis associated with a third lens is perpendicular within the tolerance to the first lens axis and the second lens axis.

Another example system includes the forgoing components and the circuitry is further configured to selectively couple to each lens.

Another example system includes the forgoing components and the circuitry is further configured to maintain a selected lens activated based on image data associated with the selected lens.

Another example system includes the forgoing components and the circuitry is configured to generate a plurality of display images based on respective captured images and to provide the plurality of display images to a display for simultaneous display of the display images.

Another example system includes the forgoing components and a number of image sensors is less than a number of lenses.

According to another aspect there is provided a method. The method may include capturing an image using at least one of a plurality of lenses, each lens positioned relative to a housing of a mobile device so that a respective lens axis associated with each lens is perpendicular within a tolerance to at least a portion of at least one surface of the housing and a first lens axis associated with a first lens is perpendicular within the tolerance to a second lens axis associated with a second lens, the housing including a first surface, an opposing second surface and third, fourth, fifth and sixth surfaces connecting the first surface and the second surface thereby forming the housing; converting each captured image into respective image data using at least one image sensor coupled to the plurality of lenses; and processing the image data.

Another example method includes the forgoing operations and also includes activating at least one lens based, at least in part, on an orientation of the housing, activating corresponds to coupling the activated lens to circuitry configured to receive the image data.

Another example method includes the forgoing operations and also includes positioning a third lens so that a third lens axis is perpendicular within the tolerance to the first lens axis and the second lens axis, the third lens axis associated with the third lens.

Another example method includes the forgoing operations and also includes selectively coupling each lens to circuitry configured to receive the image data.

Another example method includes the forgoing operations and also includes maintaining a selected lens activated based on image data associated with the selected lens.

Another example method includes the forgoing operations and also includes generating a plurality of display images based on respective captured images and providing the plurality of display images to a display for simultaneous display of the display images.

Another example method includes the forgoing components and a number of image sensors is less than a number of lenses.

According to another aspect there is provided a system. The system may include one or more storage mediums having stored thereon, individually or in combination, instructions that when executed by one or more processors result in the following operations comprising: capturing an image using at least one of a plurality of lenses, each lens positioned relative to a housing of a mobile device so that a respective lens axis associated with each lens is perpendicular within a tolerance to at least a portion of at least one surface of the housing and a first lens axis associated with a first lens is perpendicular within the tolerance to a second lens axis associated with a second lens, the housing comprising a first surface, an opposing second surface and third, fourth, fifth and sixth surfaces connecting the first surface and the second surface thereby forming the housing; converting each captured image into respective image data using at least one image sensor coupled to the plurality of lenses; and processing the image data.

Another example system includes instructions that when executed by one or more processors result in the forgoing operations and also includes activating at least one lens based, at least in part, on an orientation of the housing, activating corresponding to coupling the activated lens to circuitry configured to receive the image data.

Another example system includes instructions that when executed by one or more processors result in the forgoing operations and also includes positioning a third lens so that a third lens axis is perpendicular within the tolerance to the first lens axis and the second lens axis, the third lens axis associated with the third lens.

Another example system includes instructions that when executed by one or more processors result in the forgoing operations and also includes selectively coupling each lens to circuitry configured to receive the image data.

Another example system includes instructions that when executed by one or more processors result in the forgoing operations and also includes maintaining a selected lens activated based on image data associated with the selected lens.

Another example system includes instructions that when executed by one or more processors result in the forgoing operations and also includes generating a plurality of display images based on respective captured images and providing the plurality of display images to a display for simultaneous display of the display images.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A mobile device comprising:
    a housing comprising a first surface, an opposing second surface, and a bezel, the bezel including third, fourth, fifth, and sixth surfaces extending from the first surface to the second surface thereby forming the housing;
    a plurality of lenses including at least a first lens, having a first lens axis, and a second lens, having a second lens axis, the first lens axis being perpendicular, within a tolerance, to the second lens axis, each lens is configured to capture a respective one of a plurality of images and the first and second lens axis are perpendicular, within the tolerance, to at least a portion of at least one surface of the housing, wherein at least one of the first lens or the second lens is included in the bezel;
    at least one image sensor selectively optically coupled to at least one of the first lens or the second lens, the at least one image sensor being configured to convert each captured image into respective image data; and
    circuitry to activate at least the first and second lenses of the plurality of lenses, selectively optically couple at least one of the first lens or the second lens to the at least one image sensor, receive the image data, and process the image data;
    wherein the circuitry is further to generate a plurality of display images that includes a captured image from the first lens and a captured image from the second lens and to provide the plurality of display images to a display for simultaneous display of the display images from the first lens and from the second lens.

2. The mobile device of claim 1, wherein the circuitry is further configured to activate at least one lens based, at least in part, on an orientation of the housing, activation corresponding to coupling the circuitry to the activated lens to receive the image data.

3. The mobile device of claim 1, wherein a third lens axis associated with a third lens is perpendicular within the tolerance to the first lens axis and the second lens axis.

4. The mobile device of claim 1, wherein the circuitry is further configured to maintain a selected lens activated based on image data associated with the selected lens.

5. The mobile device of claim 1, wherein a number of image sensors is less than a number of lenses.

6. A system, comprising:
    a mobile device comprising:
        a housing comprising a first surface, an opposing second surface, and a bezel, the bezel including third, fourth, fifth, and sixth surfaces extending from the first surface to the second surface thereby forming the housing;
        a plurality of lenses including at least a first lens, having a first lens axis, and a second lens, having a second lens axis, the first lens axis being perpendicular, within a tolerance, to the second lens axis, each lens is configured to capture a respective one of a plurality of images and the first and second lens axis are perpendicular, within the tolerance, to at least a portion of at least one surface of the housing, wherein at least one of the first lens or the second lens is included in the bezel;
        at least one image sensor selectively optically coupled to at least one of the first lens or the second lens, the at least one image sensor being configured to convert each captured image into respective image data, and
        circuitry to activate at least the first and second lenses of the plurality of lenses, selectively optically couple at least one of the first lens or the second lens to the at least one image sensor, receive the image data, and process the image data;
        wherein the circuitry is further to generate a plurality of display images that includes a captured image from the first lens and a captured image from the second lens and to provide the plurality of display images to a display for simultaneous display of the display images from the first lens and from the second lens; and
    a remote service configured to control the mobile device remotely, the remote service comprising a processor, communication circuitry coupled to the processor, and a memory.

7. The system of claim 6, wherein the remote service is configured to receive image data from the mobile device and to generate a response based on the received image data.

8. The system of claim 7, wherein the remote service is further configured to provide the response to the mobile device, the response configured to cause the mobile device to activate a selected lens and to deactivate other lenses based on the response.

9. The system of claim 6, wherein the circuitry is further configured to activate at least one lens based, at least in part, on an orientation of the housing, activation corresponds to coupling the circuitry to the activated lens to receive the image data.

10. The system of claim 6, wherein a third lens axis associated with a third lens is perpendicular within the tolerance to the first lens axis and the second lens axis.

11. The system of claim 6, wherein the circuitry is further configured to maintain a selected lens activated based on image data associated with the selected lens.

12. The system of claim 6, wherein the circuitry is configured to generate a plurality of display images based on respective captured images and to provide the plurality of display images to a display for simultaneous display of the display images.

13. The system of claim 6, wherein a number of image sensors is less than a number of lenses.

14. A method comprising:
activating at least a first lens, having a first lens axis, and a second lens, having a second lens axis, the first lens axis being perpendicular, within a tolerance, to the second lens axis, each lens is configured to capture a respective one of a plurality of images and the first and second lens axis are perpendicular, within the tolerance, to at least a portion of at least one surface of the housing, the housing comprising a first surface, an opposing second surface, and a bezel, the bezel including third, fourth, fifth, and sixth surfaces extending from the first surface to the second surface thereby forming the housing, wherein at least one of the first lens or the second lens is included in the bezel;
selectively optically coupling at least one image sensor to at least one of the first lens or the second lens;
capturing an image from each of the first and second lenses;
converting each captured image into respective image data using the at least one image sensor;
processing the image data; and
generating a plurality of display images that includes a captured image from the first lens and a captured image from the second lens and providing the plurality of display images to a display for simultaneous display of the display images from the first lens and from the second lens.

15. The method of claim 14, further comprising:
activating at least one lens based, at least in part, on an orientation of the housing, activating corresponding to coupling the activated lens to circuitry configured to receive the image data.

16. The method of claim 14, further comprising:
positioning a third lens so that a third lens axis is perpendicular within the tolerance to the first lens axis and the second lens axis, the third lens axis associated with the third lens.

17. The method of claim 14, further comprising:
maintaining a selected lens activated based on image data associated with the selected lens.

18. The method of claim 14, wherein a number of image sensors is less than a number of lenses.

19. A system comprising one or more storage mediums having stored thereon, individually or in combination, instructions that when executed by one or more processors result in the following operations comprising:
activating at least a first lens, having a first lens axis, and a second lens, having a second lens axis, the first lens axis being perpendicular, within a tolerance, to the second lens axis, each lens is configured to capture a respective one of a plurality of images and the first and second lens axis are perpendicular, within a tolerance, to at least a portion of at least one surface of the housing, the housing comprising a first surface, an opposing second surface, and a bezel, the bezel including third, fourth, fifth, and sixth surfaces extending from the first surface to the second surface thereby forming the housing, wherein at least one of the first lens or the second lens is included in the bezel;
selectively optically coupling at least one image sensor to at least one of the first lens or the second lens;
capturing an image from each of the first and second lenses;
converting each captured image into respective image data using the at least one image sensor;
processing the image data; and
generating a plurality of display images that includes a captured image from the first lens and a captured image from the second lens and providing the plurality of display images to a display for simultaneous display of the display images from the first lens and from the second lens.

20. The system of claim 19, wherein the instructions that when executed by one or more processors results in the following additional operations:
activating at least one lens based, at least in part, on an orientation of the housing, activating corresponding to coupling the activated lens to circuitry configured to receive the image data.

21. The system of claim 19, wherein the instructions that when executed by one or more processors results in the following additional operations:
positioning a third lens so that a third lens axis is perpendicular within the tolerance to the first lens axis and the second lens axis, the third lens axis associated with the third lens.

22. The system of claim 19, wherein the instructions that when executed by one or more processors results in the following additional operations:
maintaining a selected lens activated based on image data associated with the selected lens.

23. The system of claim 19, wherein the instructions that when executed by one or more processors results in the following additional operations:
generating a plurality of display images based on respective captured images and providing the plurality of display images to a display for simultaneous display of the display images.

24. The system of claim 19, wherein a number of image sensors is less than a number of lenses.

25. The mobile device of claim 1, wherein the circuitry causes a first lens shutter associated with the first lens to selectively optically decouple the first lens from the image sensor and causes a second lens shutter associated with the second lens to selectively optically decouple the second lens from the image sensor.

26. The system of claim 6, wherein the circuitry causes a first lens shutter associated with the first lens to selectively optically decouple the first lens from the image sensor and causes a second lens shutter associated with the second lens to selectively optically decouple the second lens from the image sensor.

27. The method of claim 14, wherein selectively optically coupling includes causing a first lens shutter associated with the first lens to selectively optically decouple the first lens from the image sensor and causing a second lens shutter associated with the second lens to selectively optically decouple the second lens from the image sensor.

28. The system of claim 19, wherein selectively optically coupling includes causing a first lens shutter associated with the first lens to selectively optically decouple the first lens from the image sensor and causing a second lens shutter associated with the second lens to selectively optically decouple the second lens from the image sensor.

* * * * *